United States Patent [19]

Beck et al.

[11] 4,170,373
[45] Oct. 9, 1979

[54] WIRE SUSPENSION ARM

[75] Inventors: Harold L. Beck, Marine City, Mich.; Robert A. Wuebker, Westerville, Ohio; Louis J. Aure, deceased, late of Sterling Heights, Mich., by Bertha Aure, executrix

[73] Assignee: General Signal Corporation, Stamford, Conn.

[21] Appl. No.: 893,845

[22] Filed: Apr. 6, 1978

[51] Int. Cl.² .......................................... B60K 17/30
[52] U.S. Cl. .................................. 280/666; 280/696
[58] Field of Search .............. 280/690, 691, 696, 701, 280/666, 660, 673, 674, 675

[56] References Cited

U.S. PATENT DOCUMENTS

| | | | |
|---|---|---|---|
| 2,083,627 | 6/1937 | Youngren | 280/661 |
| 2,123,087 | 7/1938 | Leighton | 280/661 |
| 2,321,832 | 6/1943 | Leighton | 280/666 |
| 2,544,331 | 3/1951 | Kogstrom | 280/661 |
| 2,605,118 | 7/1952 | Booth | 280/661 |
| 2,664,297 | 12/1953 | Booth | 280/661 |
| 2,717,152 | 9/1955 | Hopkins | 267/20 R |
| 2,886,341 | 5/1959 | MacPherson | 280/674 |
| 2,968,492 | 1/1961 | Nallinger | 280/692 |

FOREIGN PATENT DOCUMENTS 630683 12/1961 Italy ........................................ 280/666

Primary Examiner—Philip Goodman
Attorney, Agent, or Firm—Leitner, Palan, Martin & Bernstein

[57] ABSTRACT

A suspension arm is formed from a single wire having a coined U-shaped portion, a pair of wire portions extending divergently from the legs of the U-shaped portion and a coined annulus on the end of each wire portion. The axis of at least one of the wire portions is oblique to the plane of the coined U-shaped portion. The axis of the coined annuli are colinear and the plane of each coined annuli is at an angle to the plane of the coined U-shaped portion.

A method of fabricating the wire suspension arm using cold working begins with upsetting the ends of the wire and proceeds with bending the wire into a U-shape, bending the wire to form divergent portions, at least one wire portion being oblique to the plane of the U, and bending the ends to be parallel to each other. The ends are coined and the bight of the U is coined.

29 Claims, 11 Drawing Figures

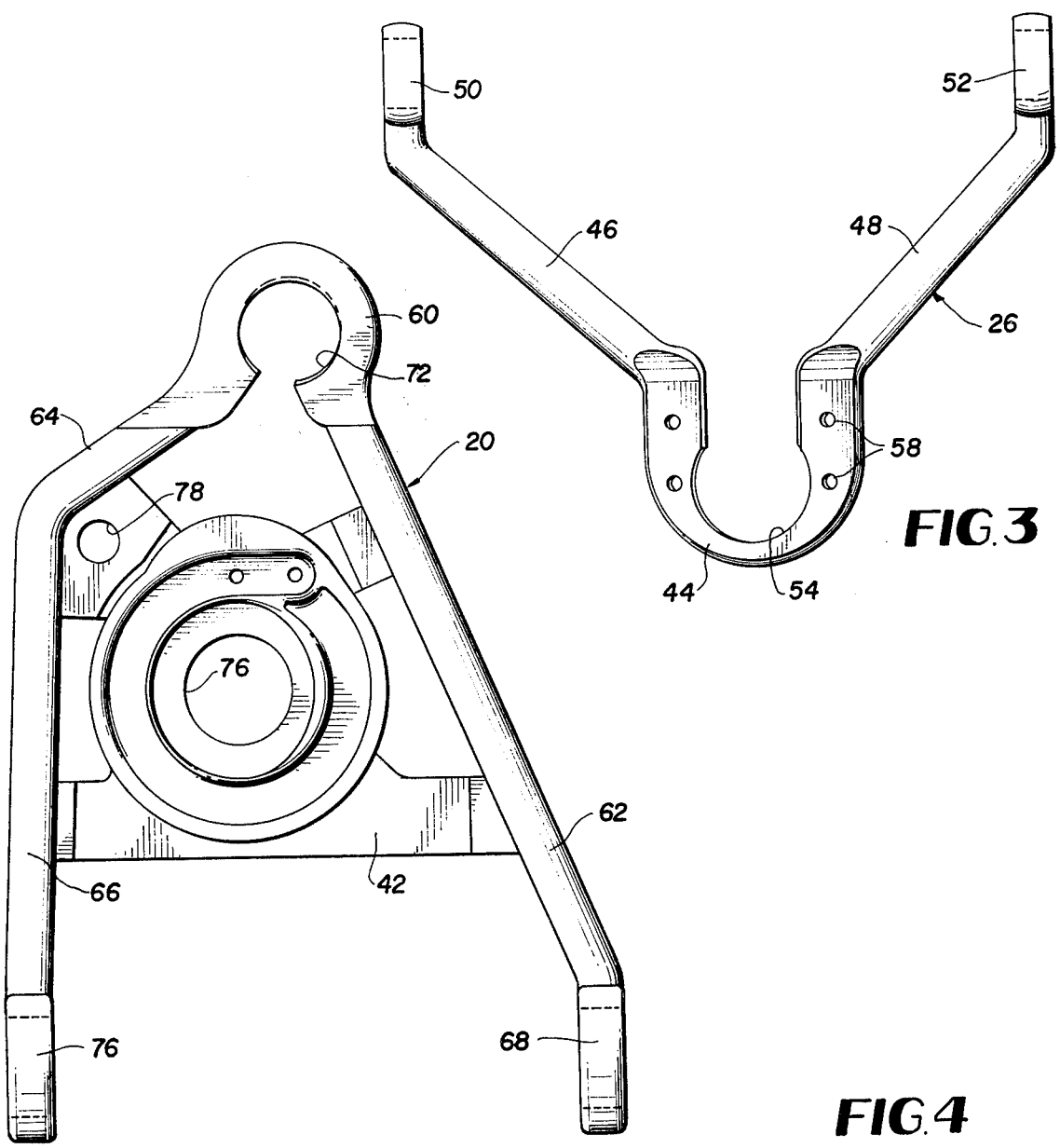
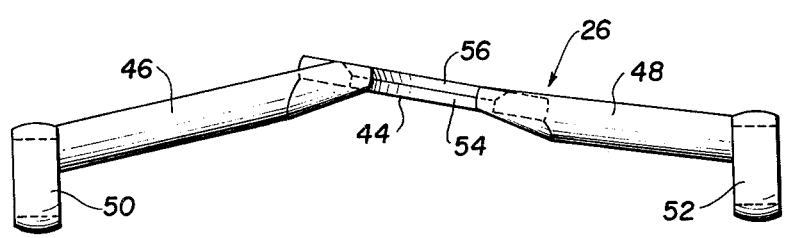
FIG.3
FIG.5
FIG.4
FIG.6

4,170,373

WIRE SUSPENSION ARM

BACKGROUND OF THE INVENTION

This present invention relates generally to a suspension system for vehicles and more particularly to a novel suspension arm assembly and method of making the same from wire.

DESCRIPTION OF THE PRIOR ART

Several problems inherent in the wheel suspensions of vehicles have been primarily due to the load that must be absorbed in various parts used in the system. This has necessitated the use of many forgings in the part for components in these systems. However, forging costs are high and efforts have been made to reduce the costs through the use of sheet metal parts. With sheet metal parts, however, noise vibration transmission into the vehicle is increased since the sheet metal parts do not absorb high frequency vibrations as well as forging.

As a result of the energy crisis, there has also been a great concern to reduce the overall weight of a vehicle. Wire suspension arms reduce the weight and costs of the suspension system over forged as well as sheet metal suspension arms. The use of wire formed suspension arms is well known in the prior art, but these arms generally have not been able to duplicate the function of forged or sheet metal suspension arms. The wire suspension arms of the prior arts have generally been non-unitary or if unitary have required additional elements for attachment of the wheel spindle which are subject to great stress and forces.

Thus there exists a need for a wire suspension arm formed from a single piece of wire which reproduces the surface and functions of the forged or sheet metal suspension arms of the prior art while reducing the costs of manufacture and overall weight.

SUMMARY OF THE INVENTION

The present invention is a wire suspension arm formed from a single piece of wire having a coined U-shaped portion for receiving the spindle ball joint, a pair of wire portions divergently extending from the legs of the coined U, and a coined annulus extending from the ends of the wire portions. The plane of the annuli are parallel to each other and their axes are colinear. The axis of at least one of the wire portions is oblique to the plane of the coined U-shaped portion. The interior arc of the coined U-shaped portion constitutes greater than a 180 degree of a circle. For an upper suspension arm, the plane of the coined U-shaped portion is oblique to the plane of the annuli and one of the wire portions lie in the plane of the coined U-shaped portion. Also the two wire portions are of equal length and form and diverge at substantially equal angles from the U-shaped portions. For a lower suspension arm, the plane of the coined U-shaped portion is perpendicular to the plane of the annuli and the axis of the annuli is parallel to the plane of the coined U-shaped portion. Also the two wire portions are of unequal length wherein one of the wire portion diverges at a greater angle than the other wire portion and the greater diverging wire portion has a second portion whose axis is substantially in the plane of the annuli.

A suspension system including an upper or lower arm in a wheel spindle connected therebetween may include either an upper or lower suspension arm formed from wire or both of the suspension arms being formed from wire. The coined U-shaped portion receives the spindle mounted ball joint. Depending on the vehicle's suspension, one of the wire suspension arms will include a spring seat secured thereto extending between the wire portions of the suspension arm.

The method of manufacture begins with cutting a piece of wire to an appropriate length and upsetting each of the ends to form a ball thereon. The balls are then coined to form end landings on each of the ends of the wire. The wire is then bent by cold working to form a substantially U-shape. The bight of the U-shape is then coined to form a bight landing. The wire is then bent by cold working on each side of the bight landing to form wire portions divergently extending from the bight landing, the axis of at least one of the wire portions being oblique to the plane of the bight landing. Similarly, the bending is performed such that the end landings are parallel to each other. The end landings are then bored to form annulus whose axes are colinear. The bight landing is also bored to form an interior arc which constitutes greater than 180 degrees of a circle. The bending steps to form a substantially U-shape and the divergent wire portions may be performed simultaneously. Also the coining of the bight portion may be performed after all the bending operations.

OBJECTS OF THE INVENTION

An object of the present invention is to provide an economical, light weight unitary wire suspension arm.

Another object of the invention is to provide a unitary wire suspension arm duplicating the functions of the forged and sheet metal suspension arms.

A further object of the invention is to provide a unitary wire arm which is economical to produce.

Other objects, advantages, and novel features of the invention will become apparent from the following detailed description of the invention when considered in conjunction with the accompanying drawings.

BRIEF DESCRIPTION OF THE DRAWINGS

FIG. 3 is a plane elevation of an upper suspension arm incorporating the principles of the present invention.

FIG. 4 is a top elevation of the upper suspension arm of FIG. 3.

FIG. 5 is a plane elevation of a lower suspension arm incorporating the principles of the present invention.

FIG. 6 is a right side elevation of the lower suspension arm of FIG. 5.

DESCRIPTION OF THE PREFERRED EMBODIMENTS

Figure 1:
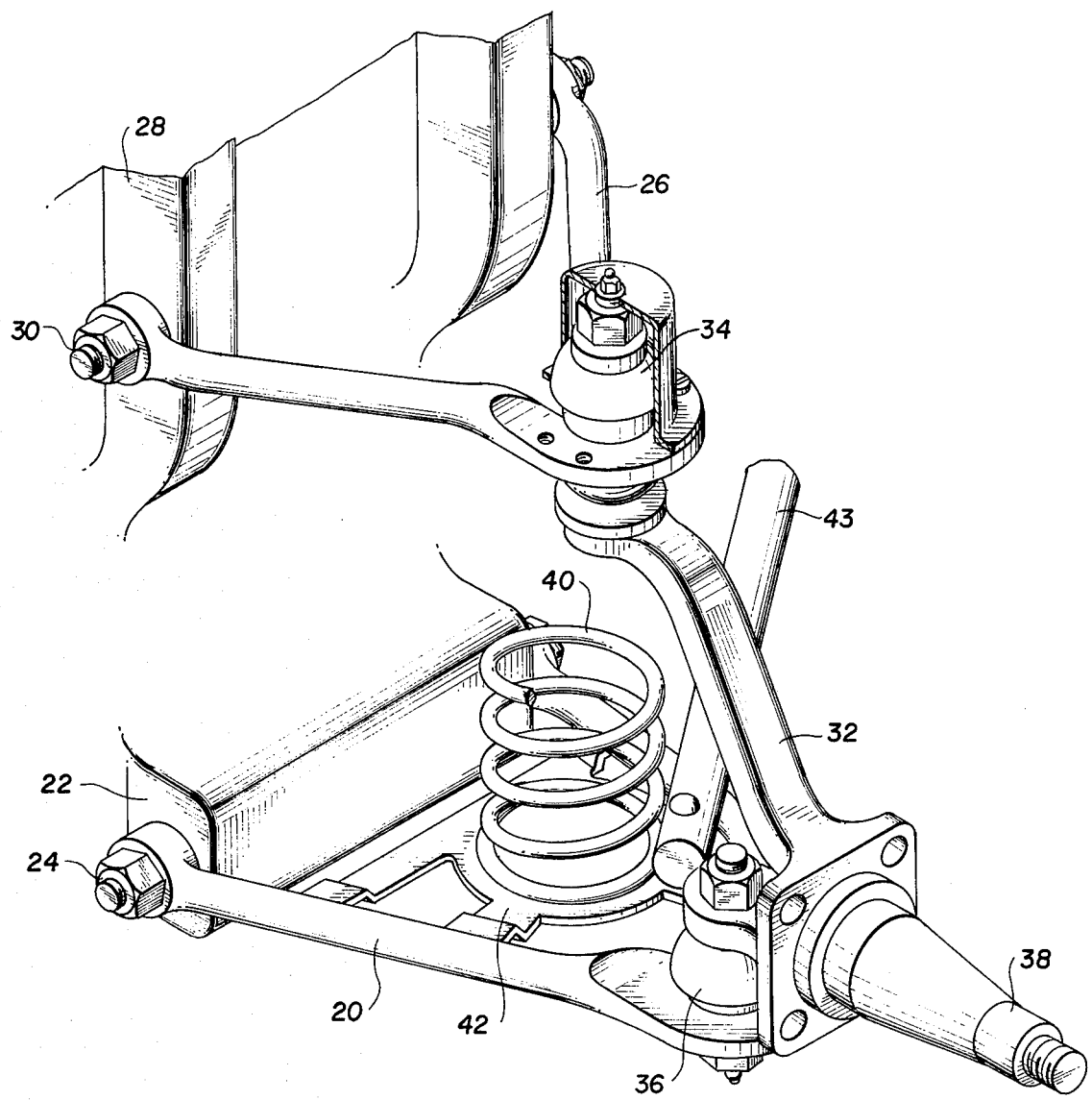
FIG. 1 is a perspective view of a vehicle suspension having a suspension spring on the lower suspension arm and incorporating the principles of the present invention.
Figure 2:
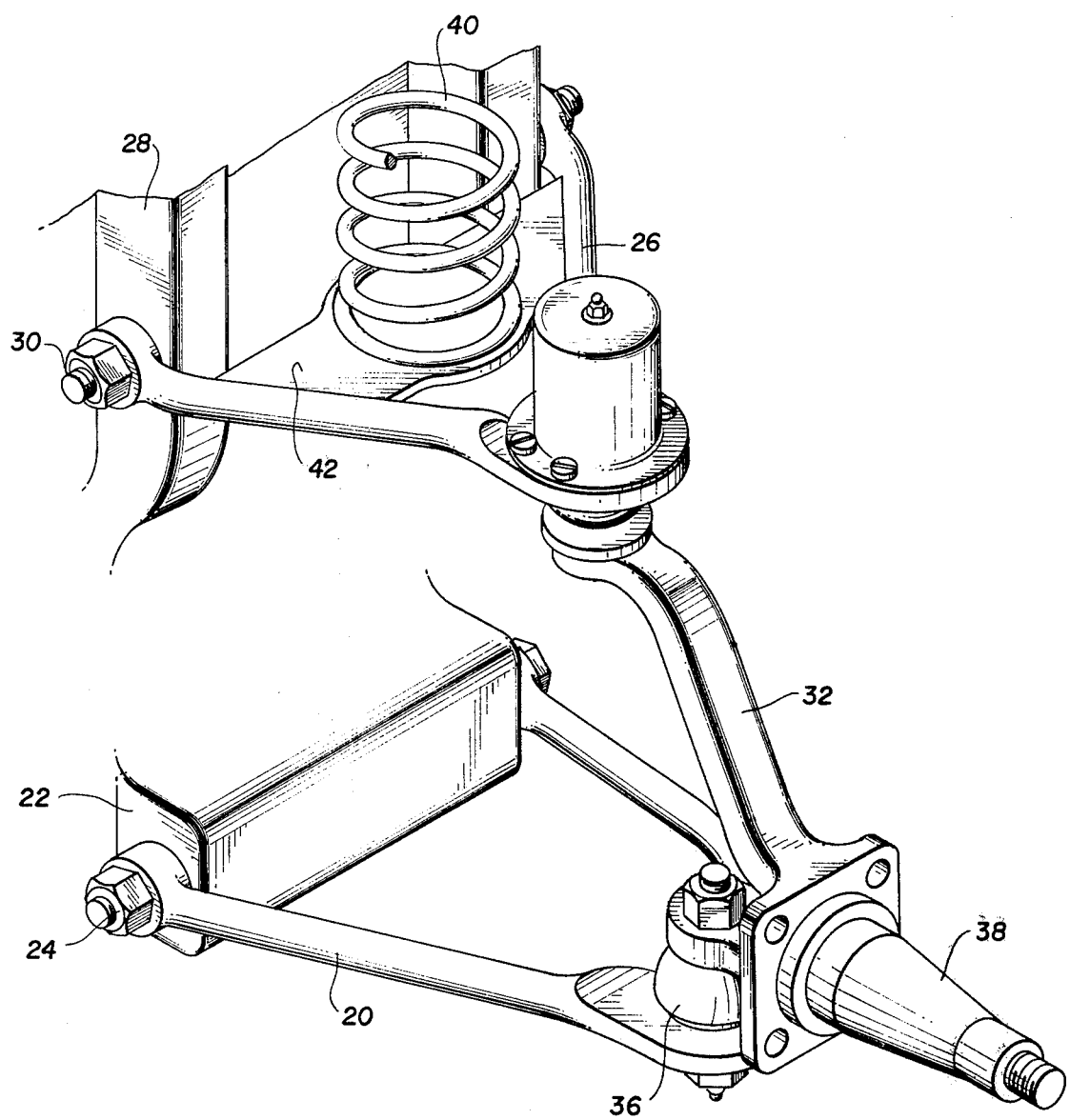
FIG. 2 is a perspective view of a vehicle suspension having a suspension spring on the upper suspension arm and incorporating the principles of the present invention.

In FIGS. 1 and 2, a vehicle front end suspension is shown having a lower support arm 20 connected to frame 22 by pivot 24 and an upper support arm 26 connected to vehicle frame 28 by pivot 30. A wheel support spindle 32 is joined at its upper end by a ball joint 34 to the upper arm 26 and at its lower end by ball joint 36 to the lower arm 20. The spindle 32 has a stud shaft portion 38 upon which a road tire and wheel combination is mounted.

A suspension spring of coil type 40 is mounted between one of the suspension arms and the body support structure of the vehicle. In FIG. 1 the suspension spring 40 is mounted to the lower suspension arm 20 and in FIG. 2 it is mounted to the upper suspension arm 26. A spring seat 42 is shown in FIG. 1 mounted to the lower arm 20 to receive the spring and in FIG. 2 the upper arm 26. In all other aspects, the suspension system of FIG. 2 is substantially identical to the suspension system of FIG. 1. A strut 43 is shown in FIG. 1 connecting the lower arm 20 to the vehicle body. It should be noted that the shock absorbers, stabilizer bars and other suspension system related elements have been deleted from FIGS. 1 and 2 for sake of clarity and that their mounting to the upper or lower suspension arm of the present invention is the same as for sheet metal or forged suspension arms of the prior art.

Although FIGS. 1 and 2 illustrate a suspension system incorporating the wire suspension arm of the present invention in the upper and lower suspension arms, a single wire suspension arm may be used with a forged or sheet metal suspension if desired. Since it is an object of the present invention to produce a wire suspension arm which is functionally equivalent to a sheet metal or forged suspension arm, the suspension arm of the present system is interchangeable with sheet metal or forged suspension arms and thus they could be used separately or in combination.

The upper suspension arm 26 is illustrated in FIGS. 3 and 4 as including a coined U-shaped portion 44 having a pair of divergently extending wire portions 46 and 48 each terminating in a coined annulus 50 and 52. The interior arc 54 of the bight of the coined U-shaped portion 44 constitutes greater than 180 degrees of a circle. The bottom side of interior arc 54 is chambered at 56. Apertures 58 are provided in the coined U-shaped portion such that the ball joint from the spindle may be received in portions 54 and 56 and secured thereto by fasteners through apertures 58.

The angular relationship between the U-shaped portion 44 and the arms 46 and 48 and the coined annuli 50 and 52 duplicate that of forged or stamped suspension arms. The annuli 50 and 52 are bored to receive a pin 30 as illustrated in FIGS. 1 and 2 or a pair of pins. The axis of the annuli 50 and 52 are colinear and the planes of the annuli are parallel. As used herein the term plane of any portion is considered the plane perpendicular to the axis of that portion. The plane of the coined U-shaped portion 44 is oblique to the planes of the annuli 50 and 52. With the planes of the annuli vertical, the plane of the coined U-shaped portion 44 is considered substantially horizontal, since the oblique angle is relatively small relative to the horizontal. The axis of wire portion 48 is within the plane of the coined U-shaped portion 44 and the axis of wire portion 46 is oblique to the plane of the coined U-shaped portion 44. The wire portion 46 and 48 are of substantially equal length and diverge at substantially equal angles from the leg of the U-shaped portion 44 in the plane illustrated in FIG. 3.

The lower suspension arm 20 illustrated in FIGS. 5 and 6 includes a coined U-shaped portion 60 having a first wire portion 62 divergently extending therefrom and a second leg including a second wire portion having sections 64, 66 extending divergently therefrom and a pair of coined annuli 68 and 70 extending from the ends of wire portion 62 and 66. The interior arc 72 of the coined U-shaped portion 60 constitutes greater than 180 degrees portion of a circle. The wire portions 62, 64 and 66 are coplanar. The plane defined by the coined section 66 is oblique to the plane defined by the wire portions 62, 64 and 66. The planes of the annuli 68 and 70 are perpendicular to the plane of the coined U-shaped portion 60. The axis of the annuli 68 and 70 are colinear and parallel to the plane of the coined U-shaped portion 60. The wire portion 62 and wire portions 64 and 66 are of unequal lengths and the wire portion 64 diverging at a greater angle than the wire portion 62 in the plane of the coined U-shaped portion 60. The wire portion 66 is substantially coplanar with the plane of the annulus 70. A spring support 42 is secured by, for example, welding to the wire portions 62, 64 and 66. An opening 76 is provided in the spring support 42 to accommodate a portion of the shock absorber. An opening 78 is also provided in the spring support 42 for attachment of strut 43 illustrated in FIG. 1 and the stabilizer bars if desired.

Although the spring support 42 has been illustrated in FIGS. 5 and 6 as being secured to the lower suspension arm 20, it should be noted that it may also be mounted to the upper suspension arm 26 to provide for the suspension system illustrated in FIG. 2. As with the upper suspension arm 26, lower suspension arm 20 illustrated in FIGS. 5 and 6 duplicate the planar and function relationships previously produced only by forged or sheet metal suspension arms.

The geometric relationship and functions of the suspension arms of FIGS. 3–6 are merely an example. The present invention is considered to provide a means for duplicating the geometric relationship and functions of any sheet metal or forged suspension arm set. The coined annuli may be replaced by coaxial threaded portions extending along the axis of the annuli.

Figure 7:
FIGS. 7–11 are views illustrating a method of fabricating a suspension arm according to the principles of the present invention.
Figure 8:
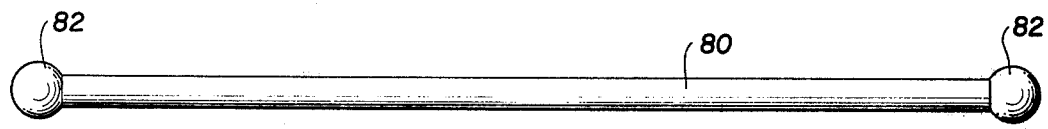
Figure 9:
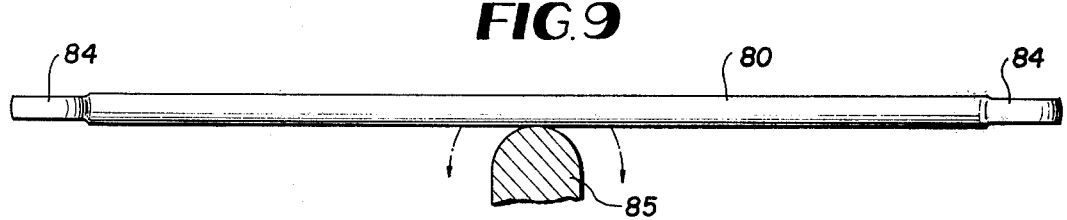
Figure 10:
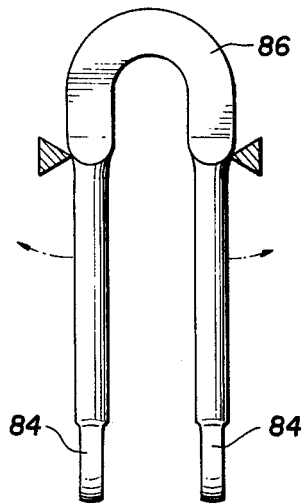
Figure 11:
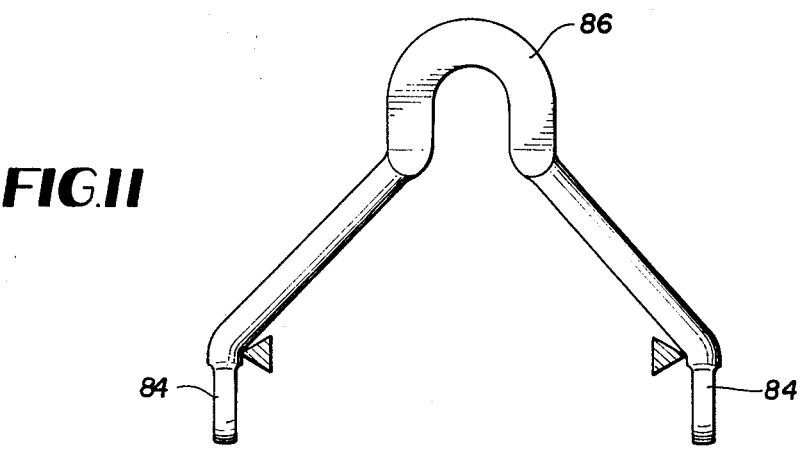

The method of fabrication of the suspension arm of FIGS. 3–6 is illustrated in FIGS. 7–11. A wire, for example, having a three quarter inch diameter is uncoiled and cut to a desired length as illustrated in FIG. 7. The ends of the bar of wire 80 are upset to form balls 82 as illustrated in FIG. 8. Balls 82 are then coined to form end landings 84. The bar 80 is then bent by cold working about a mandral or a form 85 to produce the generally U-shaped member illustrated in FIG. 10. The bight of the U is then coined to form bight landing 86 as illustrated in FIG. 10. The wire portions extending from the bight portion 86 are then bent by cold working to form wire portions diverging from the legs of the U and at least one of which is oblique to the plane of the coined U. The end landings 44 are then bent so as to be parallel to each other as illustrated in FIG. 11. The required openings in landings 84 are then bored so that their axes are colinear and the interior of bight landing 86 is bored to produce the arc which represents greater than 180 degrees of a circle. Steps for drilling and other operations may then be performed as required. Bending steps of FIGS. 9 and 11 may be performed simultaneously as well as performing the coining and drilling in any desired sequence. The important part of the sequence is that the ends of the wire 80 be upset into balls 82 before bending and coining process takes place. Although the process of FIGS. 7–11 illustrated the fabrication of the upper suspension arm 26, the sequence and steps are the same to produce the lower suspension arms 20. The difference in the fabrication is the bending required to form the dog leg wire portion 64 and 66 and the planar relationship of the wire portions 62, 64, and 66.

From the preceding description of the preferred embodiments it is evident that the objects of the invention are obtained in that a suspension arm formed from a single piece of wire duplicating the geometric relationship previously produced only by sheet metal or forged suspension arm is provided with a reduction in weight and manufacturing costs. Although the invention has been described and illustrated in detail, it is to be clearly understood that the same is by way of illustration and example only and is not to be taken by way of limitation. The spirit and scope of this invention is to be limited only by the terms of the appended claims.

What is claimed:

1. A suspension arm formed from a single wire comprising:
   a coined U-shaped portion for receiving a ball bearing means interior the bight of said U-shape;
   a first wire portion extending from one leg of said U-shaped portion at a divergent angle measured in the plane of said U-shaped portion;
   a second wire portion extending from the other leg of said U-shaped portion at a divergent angle measured in the plane of said U-shaped portion;
   the axis of at least one of said wire portions being oblique to the plane of said U-shaped portion; and
   a coined annulus extending from the end of each of said first and second wire portions, the planes of said annuli being parallel to each other.

2. The suspension arm according to claim 1 wherein the axis of said annuli are not in the plane of said coined U-shaped portion and the plane of said coined U-shaped portion is perpendicular to the planes of said annuli.

3. The suspension arm according to claim 1 wherein the plane of said coined U-shaped portion is oblique to the planes of said annuli.

4. The suspension arm according to claim 3 wherein the axis of said first and second wire portions are not coplanar and said first wire portion and said coined U-shaped portion are coplanar.

5. The suspension arm according to claim 1 wherein said first and second wire portions are of equal length and diverge from respective legs of said U-shaped portion at substantially equal angles.

6. The suspension arm according to claim 1 wherein the coined U-shaped portion includes a bight having an interior arc constituting more than 180 degrees of a circle.

7. The suspension arm according to claim 1 wherein the axis of first wire portion is linear, and said second wire portion includes two sections, a first section extending from the leg of the U-shaped portion at a greater divergent angle than said first wire portion and the axis of the second section is approximately in the plane of a coined annulus.

8. The suspension arm according to claim 1 wherein the axis of said first and second wire portions are coplanar and the plane of said first and second wire portions is oblique to the plane of said coined U-shaped portion.

9. The suspension arm according to claim 1 including means secured to and between said first and second wire portions for supporting a spring.

10. An upper suspension arm formed from a single wire comprising:
    a coined U-shaped portion for receiving a ball bearing means interior the bight of said U-shape;
    a first wire portion extending from one leg of said U-shaped portion at a divergent angle;
    a second wire portion extending from the other leg of said U-shaped portion at a divergent angle substantially equal to the divergent angle of said first wire portions; and
    a coined annulus extending from the end of each of said first and second wire portions, the planes of said annuli being parallel to each other and oblique to the plane of said U-shaped portion.

11. The upper suspension arm according to claim 10 wherein the axis of said annuli are colinear.

12. The upper suspension arm according to claim 10 wherein the axis of said first and second wire portions are not coplanar and said first wire portion and said coined U-shaped portion are coplanar.

13. The upper suspension arm according to claim 10 wherein the coined U-shaped portion includes a bight having an interior arc constituting more than 180 degrees of a circle.

14. The upper suspension arm according to claim 10 including means secured to and between said first and second wire portions for supporting a spring.

15. A lower suspension arm formed from a single wire comprising:
    a coined U-shaped portion for receiving a ball bearing means interior the bight of said U-shape;
    a first wire portion extending from one leg of said U-shaped portion at a divergent angle;
    a second wire portion extending from the other leg of said U-shaped portion at a divergent angle;
    the axis of said first and second wire portions being coplanar and the plane of said first and second wire portions being oblique to the plane of said U-shaped portion; and
    coined annulus extending from the end of each of said first and second wire portions, the planes of said annuli being parallel to each other and perpendicular to the plane of said U-shaped portion.

16. The lower suspension arm according to claim 15 wherein the coined U-shaped portion includes a bight having an interior arc constituting more than 180 degrees of a circle.

17. The lower suspension arm according to claim 15 wherein the axis of first wire portion is linear, and said second wire portion includes two sections, a first section extending from the leg of the U-shaped portion at a greater divergent angle than said first wire portion and the axis of the second section is approximately in the plane of a coined annulus.

18. The lower suspension arm according to claim 15 including means secured to and between said first and second wire portions for supporting a spring.

19. A suspension arm formed from a single wire comprising:
    a coined U-shaped portion having an opening substantial in the plane of the U-shaped portion for receiving a ball bearing means, said opening being an interior arc of the bight of said U-shaped portion constituting more than 180 degrees of a circle;
    a first and second wire portions extending from respective legs of said U-shaped portion at divergent angles, measured in the plane of said coined U-shaped portion;
    the axis of at least one of said wire portion being oblique to the plane of said coined U-shaped portions; and mounting means extending from the end of each of said first and second wire portions, the axis of said mounting means being colinear and not in the plane of said coined U-shaped portion.

20. The suspension arm according to claim 19 wherein said mounting means comprises a coined annulus.

21. In a wheel suspension system having upper and lower suspension arms and a wheel supporting spindle mounted between said upper and lower suspension arms, the improvement comprising at least one of said suspension arms being formed from a single wire and including:
- a coined U-shaped portion receiving a ball bearing means interior the bight of said U-shape interconnecting the suspension arm and said wheel supporting spindle;
- a first wire portion extending from one leg of said U-shaped portion at a divergent angle in the plane of said coined U-shaped portion;
- a second wire portion extending from the other leg of said U-shaped portion at a divergent angle measured in the plane of said coined U-shaped portion;
- the axis of at least one of said wire portions being oblique to the plane of said coined U-shaped portion; and
- a coined annulus extending from the end of each of said first and second wire portions, the planes of said annuli being parallel to each other.

22. The wheel suspension system according to claim 21 wherein both of said suspension arms are each made from a single wire and each having a coined U-shaped portion, first and second wire portions and coined annuli.

23. The wheel suspension system according to claim 21 wherein said suspension system includes a spring between said suspension are formed from wire and said vehicle and said wire arm includes a spring support means secured to and extending between said first and second wire portions.

24. The wheel suspension system according to claim 21 wherein said coined U-shaped portion includes a bight having an interior arc constituting more than 180 degrees of a circle and a ball joint connecting said spindle and said suspension arm is mounted in said bight.

25. The wheel suspension system according to claim 21 wherein said arm formed of wire is the upper suspension arm and wherein the plane of said U-shaped portion is oblique to the planes of said annuli.

26. The wheel suspension system according to claim 25 wherein the axis of said first and second wire portions are not coplanar and said first wire portion and said coined U-shaped portion are coplanar.

27. The wheel suspension system according to claim 21 wherein said arm formed of wire is the lower suspension arm; the axis of first wire portion is linear; and said second wire portion includes two sections, a first section extending from the leg of the U-shaped portion at a greater divergent angle than said first wire portion and the axis of the second section is approximately in the plane of the coined annulus.

28. The wheel suspension system according to claim 27 wherein the plane of said coined U-shaped portion is perpendicular to the planes of said annuli.

29. The wheel suspension system according to claim 21 wherein the axis of said first and second wire portions are coplanar and the plane of said first and second wire portions is oblique to the plane of said coined U-shaped portion.

* * * * *